United States Patent [19]
Berstis

[11] Patent Number: 5,918,041
[45] Date of Patent: Jun. 29, 1999

[54] METHOD AND APPARATUS FOR AUTOMATICALLY ADJUSTING A CLOCK

[75] Inventor: Viktors Berstis, Austin, Tex.

[73] Assignee: International Business Machines Corporation, Armonk, N.Y.

[21] Appl. No.: 08/979,598

[22] Filed: Nov. 26, 1997

[51] Int. Cl.$^6$ .................................................. G06F 1/04
[52] U.S. Cl. .................................................. 395/558
[58] Field of Search .................................. 395/555, 558; 368/184, 186, 200, 202

[56] References Cited

U.S. PATENT DOCUMENTS

| 4,068,463 | 1/1978 | Maeda et al. . |
| 4,086,755 | 5/1978 | Ueda . |
| 4,292,680 | 9/1981 | Morokawa et al. . |
| 4,298,971 | 11/1981 | Morokawa et al. . |
| 4,386,857 | 6/1983 | Maire . |
| 4,407,589 | 10/1983 | Davidson et al. . |
| 4,427,302 | 1/1984 | Watanabe . |
| 4,537,515 | 8/1985 | Dinger et al. . |
| 4,633,422 | 12/1986 | Braver . |
| 5,375,105 | 12/1994 | Borowski . |
| 5,444,780 | 8/1995 | Hartman, Jr. . |
| 5,528,560 | 6/1996 | Ogiyama . |

*Primary Examiner*—Thomas M. Heckler
*Attorney, Agent, or Firm*—Duke W. Yee; Jeffrey S. LaBaw

[57] ABSTRACT

A method and apparatus in a data processing system for automatically adjusting a clock signal from a clock circuit within the data processing system. The clock signal from the clock circuit is adjusted to a reference time from a source in response to a communications link being established with the source, wherein an amount of correction occurs. The amount of correction is recorded, wherein a recorded amount of correction is present in response to the step of adjusting the clock signal. A correction equation is selected using the recorded amount of correction, wherein the clock signal may be adjusted using the recorded amount of correction.

28 Claims, 5 Drawing Sheets

METHOD AND APPARATUS FOR AUTOMATICALLY ADJUSTING A CLOCK

BACKGROUND OF THE INVENTION

1. Technical Field

The present invention relates generally to an improved data processing system and in particular to an improved method and apparatus for adjusting a time generated by a clock circuit within the data processing system. Still more particularly, the present invention relates to a method and apparatus for automatic learning clock adjustment.

2. Description of the Related Art

Data processing systems contain clock generation circuits that provide a clock signal indicating a time for use in various applications. For example, the clock signal is used to provide time and date information to a user. Additionally, the clock signal is also used by applications that require an accurate time.

In general, a quartz oscillator is employed in a clock generation circuit to develop a clock signal of a predetermined frequency for use by the data processing system. It is necessary to adjust the clock generation circuit extremely precisely to provide accurate timekeeping. This type of adjustment is generally carried out at the time of manufacture. Changes in temperature, aging of the clock generation circuit, and aging of the battery in a clock generation circuit cause variations in the oscillation of the quartz oscillator. Consequently, the accuracy of the clock generation circuit may decline over these types changes in operating conditions.

Therefore, it would be advantageous to have an improved method and apparatus for automatically adjusting a clock in response to changes in operating conditions.

SUMMARY OF THE INVENTION

It is one object of the present invention to provide an improved data processing system.

It is yet another object of the present invention to provide an improved method and apparatus for adjusting a time from a clock circuit within the data processing system.

It is still yet another object of the present invention to provide a method and apparatus for automatic learning clock adjustment.

The foregoing objects are achieved as is now described. The present invention provides a method and apparatus in a data processing system for automatically adjusting a time from a clock circuit within the data processing system. The time from the clock circuit is adjusted to a reference time from a source in response to a communications link being established with the source, wherein an amount of correction occurs. The amount of correction is recorded, wherein a recorded amount of correction is present in response to the step of adjusting the time. A correction equation is selected and/or computed using the history of the recorded amounts of corrections, wherein the time may be adjusted using the equation.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
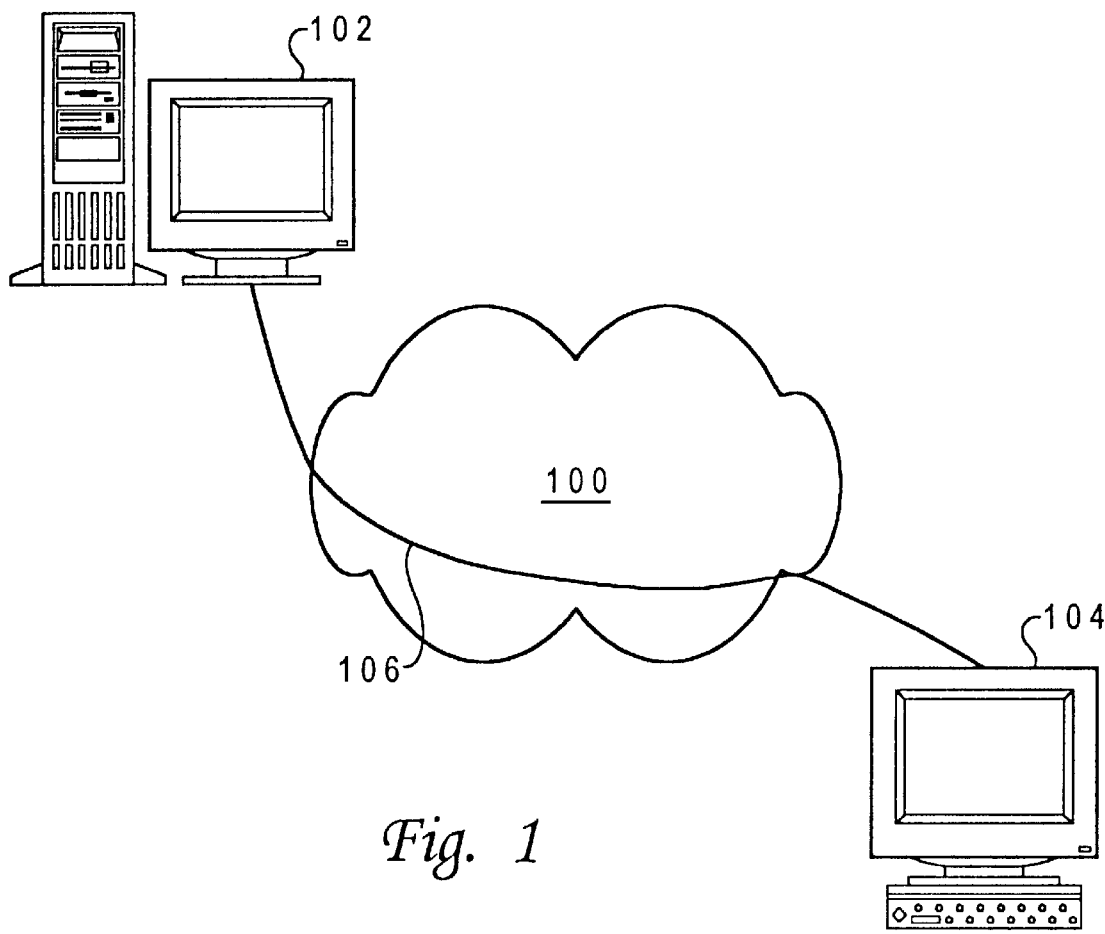
FIG. 1 is a diagram of a network illustrated in which the present invention may be implemented.

With reference now to the figures, and in particular with reference to FIG. 1, a diagram of a network is illustrated in which the present invention may be implemented. In the depicted example, network 100 is the Internet, which is a world wide network of public and private computer networks that link businesses, universities, government agencies, and other different computer systems in networks by means of a common telecommunications standard. Data processing system 102 and data processing system 104 are connected to network 100. Data processing system 102 is a source that provides a reference clock signal that may be received by data processing system 104 through communications link 106 in network 100.

Figure 2:
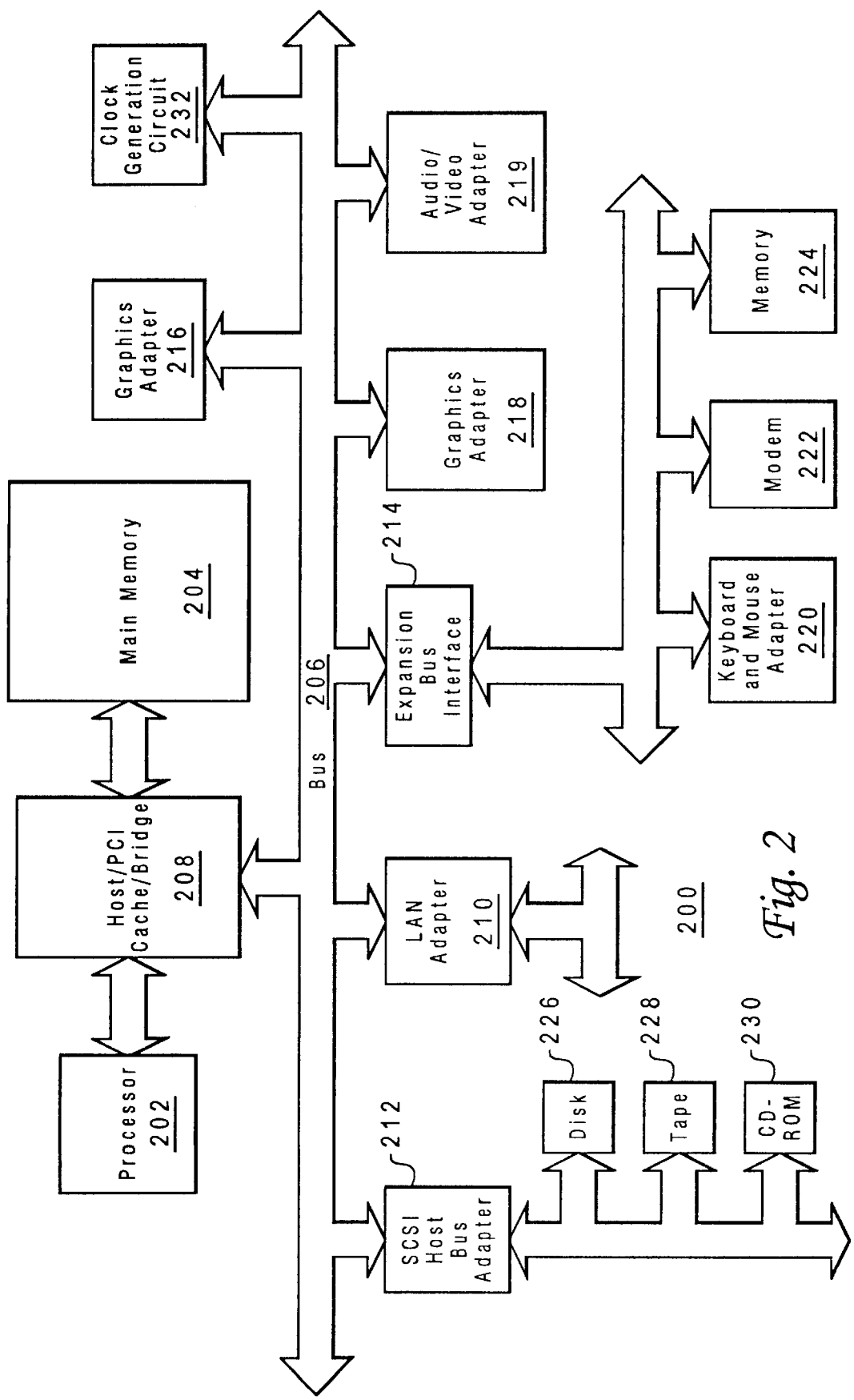
FIG. 2 is a block diagram of a data processing system in the present invention may be implemented.

Turning to FIG. 2, a block diagram of a data processing system 200 in which the present invention may be implemented is illustrated. Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM 230 in the depicted example. Clock generation circuit 232 is connected to PCI local bus 206 and provides a clock signal used by other components within data processing system 100. Typically, clock generation circuit 236 is powered by an A/C power source when data processing system 200 is in an "on" state and are powered by a battery when data processing system 200 is in an "off" state. The ratio of these states is also referred to as the percentage of system on-off time. Clock generation circuit 236 may be implemented using a number of known circuits, such as a DS 1287 chip available from Dallas Semiconductor. Changes in the "on/off" state ratio may cause variations in the accuracy of the clock signal generated by clock generation circuit 232.

Typical PCI local bus implementations will support three or four PCI expansion slots or add-in connectors. The depicted example includes four loads on the mother board and three expansion slots. Those of ordinary skill in the art will appreciate that the hardware in FIG. 2 may vary. For example, other peripheral devices, such as optical disk drives and the like may be used in addition to or in place of the hardware depicted in FIG. 2. The depicted example is not meant to imply architectural limitations with respect to the present invention.

Figure 3:
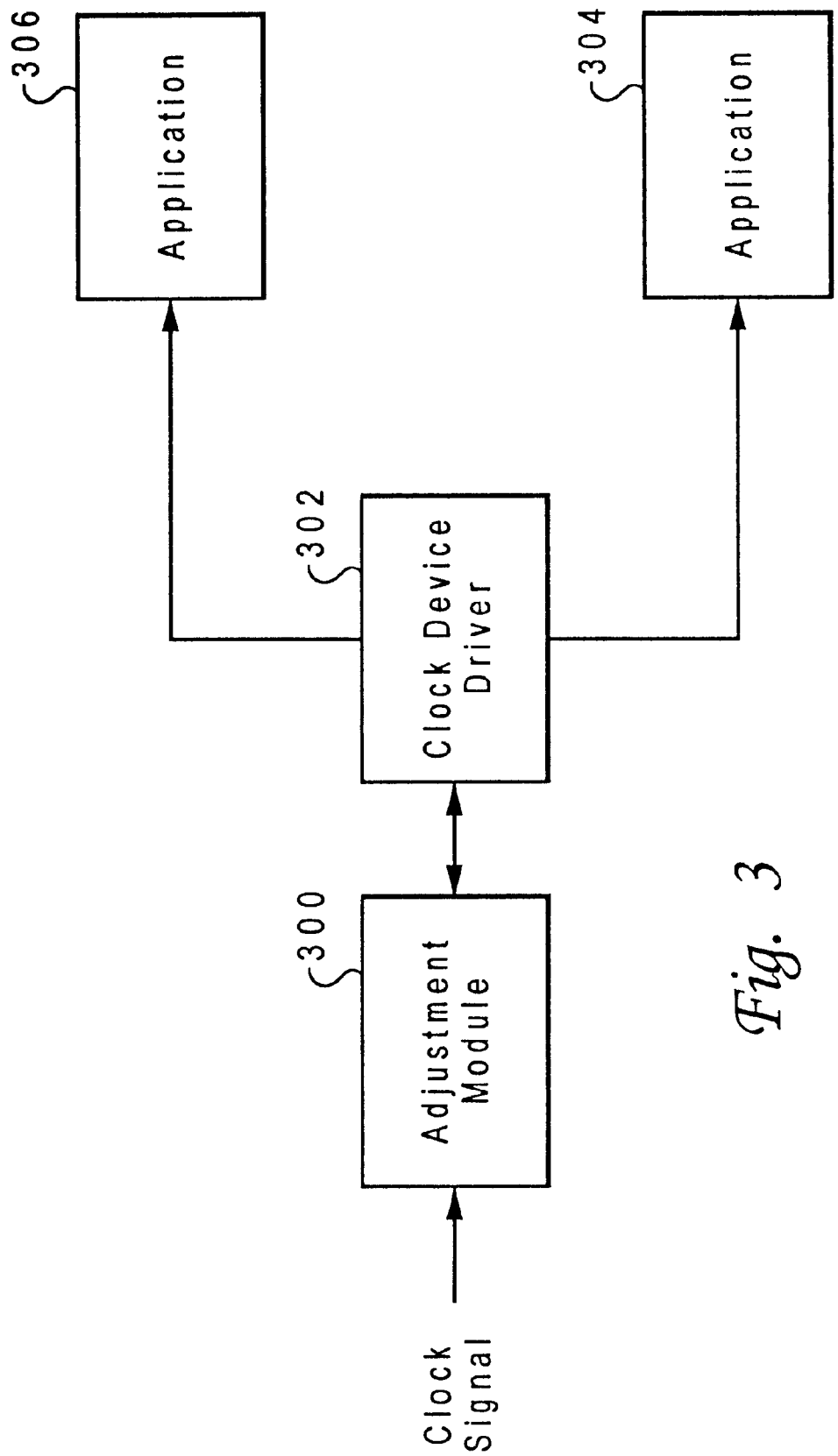
FIG. 3 is a block diagram of software components in accordance with the preferred embodiment of the present invention.

With reference now to FIG. 3, a block diagram of software components is depicted in accordance with the preferred embodiment of the present invention. In the depicted example, adjustment module 300 receives a clock signal from a clock generation circuit, such as clock generation circuit 232 in FIG. 2. Adjustment module 300 is a software module containing an equation to correct the clock signal from clock generation circuit 232. Adjustment module 300 provides the necessary adjustment to the clock signal needed to maintain the correct time. The adjusted clock signal is then sent to clock device driver 302, which provides the clock signal to various application, such as applications 304 and 306, which requires a clock signal for execution. Clock generation circuit 232 produces a count that is converted to a time by clock device driver 302. Adjustment module 300 may add or subtract from the count prior to the count being sent to clock device driver 302 to cause clock device driver 302 to generate a correct time.

As the correct time is obtained from a source, the correct time is received by clock device driver 302 and returned to adjustment module 300. The amount of correction (excluding time zone type changes) is determined by adjustment module 300 by comparing the time as computed by the equation to the correct time obtained from the source. After a few such corrections, a history of corrections is formed and the factors or coefficients in the formula are adjusted to match prior corrections, and to have the correction made automatically. The formula can include factors to account for battery aging or other factors, such as percentage of system on-off time to adjust for changes in clock frequency as the battery voltage drops over time. The anticipated adjustment will also have the learned effect from average temperature changes encountered by the clock generation circuit. After a few settings, very few additional settings are likely to be required to maintain sufficiently accurate time, but fine tuning will occur to account for behavior not taken into account by the modeling. The equation is used to model the physical attributes of the clock and various coefficients are adjusted based on the history of correction data. For example, two terms could be used for modeling the on and off times of the system. The coefficients are adjusted to best match the performance of the clock during on times and off times of the data processing system. Other terms would include, for example, the battery life and temperature changes.

Figure 4:
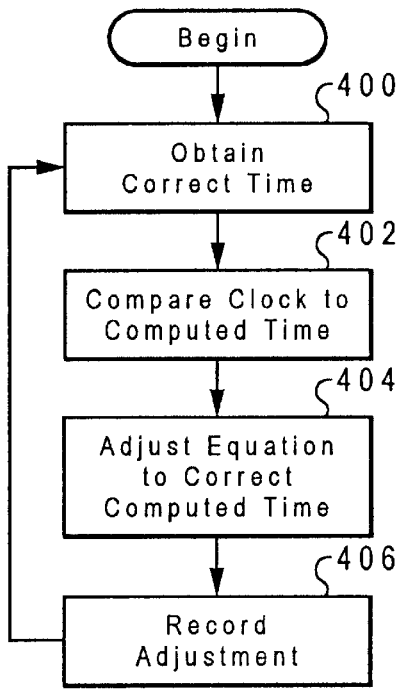
FIG. 4 is a flowchart of a process for adjusting a clock signal in accordance with a preferred embodiment of the present invention.

With reference now to FIG. 4, a flowchart of a process for adjusting a clock signal is depicted in accordance with a preferred embodiment of the present invention. Thereafter, the correct time is obtained from a source (step 400). Initially, step 400 often may be performed during the manufacture and assembly data processing system. The correct time also may be obtained from a source, such as data processing system 102 in FIG. 1. The process then compares the computed time to the correct time (step 402). The computed time is the time computed from the equation in the adjustment module. The correct time may be obtained from a reference clock signal generated by a source, such as data processing system 102 in FIG. 1. The process then adjusts the equation to obtain a correct computed time (step 404). The correct time is obtained from various sources such as the internet or some other communications channel to an accurate time device, such as an atomic clock. Thereafter, the adjustment is recorded (step 406). This step generates a history of adjustments that may be used for maintaining a correct time without using a reference clock signal. Thereafter, the process continues to return to step 400 to obtain the correct time. The correct time in step 400 may be obtained on a periodic basis or after selected events.

Figure 5:
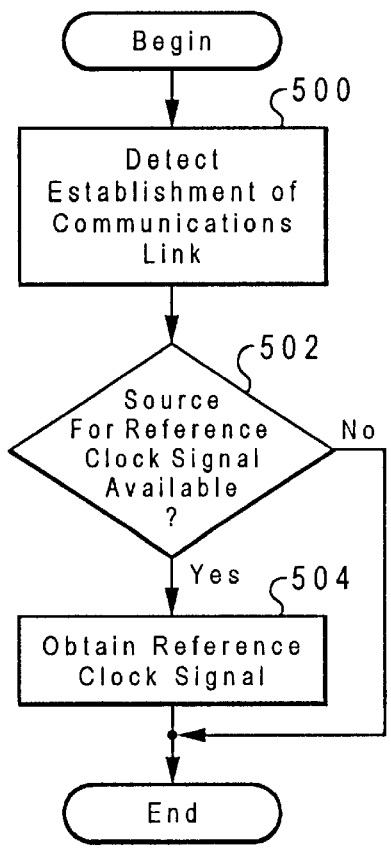
FIG. 5 is a flowchart of a process for obtaining a reference clock signal in accordance with a preferred embodiment of the present invention.

Turning now to FIG. 5, a flowchart of a process for obtaining a reference clock signal is depicted in accordance with a preferred embodiment of the present invention. FIG. 5 is a more detailed description of step 402 in FIG. 4. The process begins by detecting an establishment of a communications link (step 500). A determination is then made as to whether a source for the reference clock signal is available through the established communications link (step 502). If a source is available, the reference clock signal is obtained through the communications link (step 504). The clock signal obtained through the communications link provides a reference time that is used to adjust the time from the clock circuit within the data processing system. Otherwise, the process terminates.

Figure 6:
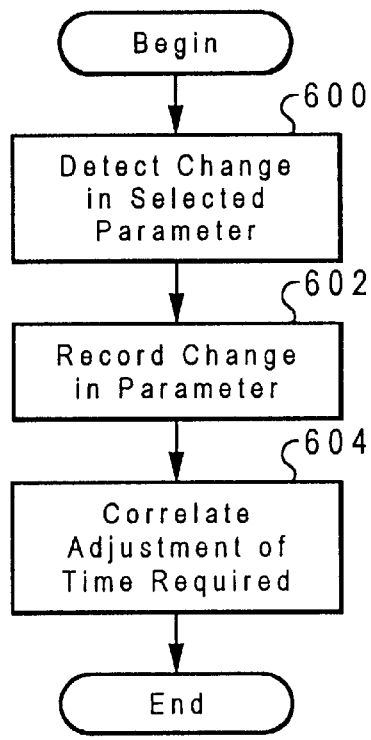
FIG. 6 is a flowchart of a process for identifying changes in operating conditions in accordance with a preferred embodiment of the present invention.

Turning now to FIG. 6, a flowchart of a process for identifying changes in operating conditions is depicted in accordance with a preferred embodiment of the present invention. This process is performed in conjunction with adjusting the time generated by the clock generation circuit in response to comparing the time to the correct time provided by a reference clock signal from a source. The process begins by detecting a change in a selected parameter (step 600). Next, the change in parameter is recorded (step 602). The process then correlates the adjustment of time required to correct the time generated by the clock circuit (step 604) with the process terminating thereafter.

The process illustrated in FIG. 6 may be performed for a number of parameters. For example, parameter such as temperature and the ratio between the time a data processing system is powered "on" or "off" may be recorded. The age of the clock generation circuit also may be recorded as a parameter, as well as the voltage from the battery source within the clock generation circuit.

Figure 7:
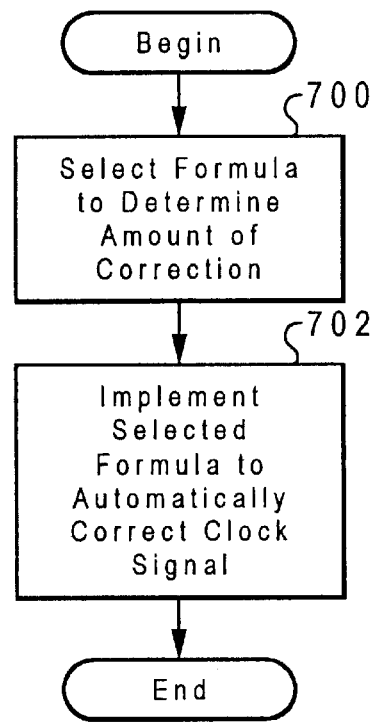
FIG. 7 is a flowchart of a process for automatically adjusting a clock signal in accordance with a preferred embodiment of the present invention.

With reference now to FIG. 7, a flowchart of a process for automatically adjusting a time from a clock circuit is depicted in accordance with a preferred embodiment of the present invention. This process uses data gathered during the steps performed in FIGS. 5 and 6. The process begins by selecting a formula to determine a correction factor needed to adjust the clock signal generated by a clock generation circuit within a data processing system (step 700). Thereafter, the selected formula is implemented to automatically correct the clock signal (step 702). The formula is an equation that factors the difference between the correct time and the time generated by the clock generation circuit. Coefficients for the equation may be obtained from recorded parameters, reflecting changes in operating conditions.

An electronic clock, such as clock generation circuit 232 in FIG. 2, is operated by battery power when the remaining part of the system is powered off. When the data processing system is powered on, the battery typically is no longer used to run the clock. Also, while the data processing system is powered on, a rechargeable battery can be charged. The electronic clock is likely to operate at different speeds during data processing system on time compared to data processing system off time. This is due to various factors such as supply voltage, temperature, noise contributions, humidity, atmospheric pressure, radiation, physical movement or vibration, as well as other possible factors.

In addition, components such as the battery, crystal, capacitors, resistors, semi-conductors and others can slowly change with age as environmental factors, chemical composition, and physical characteristics change. Finally, usage patterns can affect the operation of the clock. These include the relative amounts of system on and off times, the repetitive patterns that may be encountered hourly, daily, weekly, seasonally, etc.

These factors can be modeled using an equation which has adjustable coefficients for the various modeling factors. During operation, on certain occasions when access to accurate time is available, the clock is reset to the correct time. Accurate time can be received using the internet time protocols or other suitable means. When the clock is reset, the difference between the correct time and the time kept by the clock hardware is recorded. In addition, information is recorded which tells the duration of data processing system power off times as well as data processing system power on times. The collected data is used to solve equations for the adjustable coefficients of the modeling factors.

At each clock resetting, the prior error values are used to solve for the current adjustable coefficients, which best match the most recent data. As further clock adjustments are made, the coefficients may in fact drift in value. The drifts in these values are curve fit to a suitable formula such as line, parabola, exponential or logarithmic curve as required. The formula which best fits the drift of a co-efficient's value is selected. The adjustable co-efficient drift curve fits converge as best they can on the appropriate values to predict the hardware clock's error behavior. The curve fit formulas for the coefficients can be chosen based on experimental data, or the program can be made to select from a number of such curves to best fit the drifts of the adjustable coefficients.

To illustrate a simple example, lets assume the modeling formula for the clock has only two adjustable coefficients Fa and Fb:

$$\text{Comptime} = Fa*Hwt + Fb*Hwt**2$$

Where "Comptime" is the correct time count, and Hwt is the hardware clock time value since the last clock reset. The units can be any desired time units (microseconds, femtoseconds, seconds . . . ).

Table 1 below shows values kept in a table in a nonvolatile memory.

| Fa | Fb | Hwt | Computed Time | Correct Time |
|---|---|---|---|---|
| 1.0 | 0.0 | 300. | | 306. |
| 1.0 | 0.0 | 600. | | 618. |
| 1.01 | 0.00003333333 | 900. | 936. | 936. |
| 1.01 | 0.00003333333 | 1200. | 1260. | 1260. |
| 1.01 | 0.00003333333 | 1500. | 1590. | 1590. |

Each row represents a time at which the clock in question is compared to the correct time using the internet or other time base. The first two rows use initial values of Fa and Fb. After these two are recorded, the proper values for Fa and Fb can be found using the following two equations, which were derived using the modeling formula above using simple substitutions solving for two unknowns with two equations.

$$Fa(3) = (hwt(2)*hwt(2)*crt(1) - crt(2)*hwt(1)*hwt(1))/$$

$$Fb(3) = (hwt(2)*crt(1) - crt(2)*hwt(1))/(hwt(1)*hwt(1)*hwt(2) - hwt(2)*hwt(2)*hwt(1)))$$

Where:
hwt(1) is the hardware time value from the first row;
hwt(2) is the hardware time value from the second row;
crt(1) is the correct time value from the first row;
crt(2) is the correct time value from the second row;
Fa(3) is the new computed factor Fa for use in row 3; and
Fb(3) is the new computed factor Fb for use in row 3.

This process is reapplied by shifting all row numbers down one and recomputing the factors again on every time synchronization point. As illustrated in this particular example, even though the hardware timer was not linear, the modeling equation chosen immediately stabilized on the correct factor values to compensate for the nonlinear behavior.

In general, more complex modeling equations can be used with higher power terms as well as logarithmic, exponential, hyperbolic, or cyclic terms as needed for the hardware or environmental situations in question. Furthermore, the times of the transitions from and to battery power are recorded. These power transition times are included in the modeling equation such that different factors would apply proportional to the time durations of the different power modes. Furthermore, even if the modeling equation itself does not stabilize the factors, the trend in the factors themselves can be similarly modeled to better approximate the hardware's behavior.

Finally, the actual hardware counter value does not have to be changed when synchronizing the clock. The modeling equation would simply include the appropriate adjustment values. This eliminates the need in some hardware designs to provide for extra circuitry to change the actual clock counter value (it needs only to be read).

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include: recordable-type media such a floppy discs and CD-ROMs and transmission-type media such as digital and analog communications links.

The description of the preferred embodiment of the present invention has been presented for purposes of illustration and description, but is not limited to be exhaustive or limited to the invention in the form disclosed. Many modifications and variations will be apparent to those of ordinary skill in the art. For example, different modeling equations (i.e., a quadratic equation or a cubic equation) may be employed depending on the particular clock circuit used in a data processing system. That the embodiment was chosen and described in order to best explain the principles of the invention the practical application to enable others of ordinary skill in the art to understand the invention for various embodiments with various modifications as are suited to the particular use contemplated.

I claim:

1. A method in a data processing system for adjusting a time generated from a clock circuit within the data processing system, the method comprising:

selecting a correction equation to adjust the time from the clock circuit, wherein the equation models parameters of the clock circuit that affect the time generated from the clock circuit;

using the equation to compute a correct time from the time;

adjusting the correct time computed from the equation using a reference time from a source, wherein an amount of correction occurs; and altering the correction equation using the amount of correction, wherein the clock time may be adjusted using the amount of correction.

2. The method of claim 1 further comprising:

recording the amount of correction to form a history of corrections, wherein a recorded amount of correction is present in response to the step of adjusting the correct time; and periodically adjusting the equation using the history of corrections.

3. The method of claim 2 further comprising:

recording the amount of correction each time the correct time is adjusted to form a history of corrections, wherein the step of periodically adjusting the equation occurs after the history of correction reaches a selected size.

4. The method of claim 1, wherein the reference time is obtained in response to a communications link being established with the source.

5. The method of claim 4 further comprising:

establishing a communications link with the source prior to adjusting the correct time, wherein the communications link to the source is a communications link to the internet.

6. The method of claim 1, wherein the correction equation includes a plurality of coefficients associated with the parameters of the clock circuit that affect the time from the clock circuit.

7. The method of claim 6, wherein the step of altering the correction equation comprises altering at least one coefficient from the plurality of coefficients.

8. The method of claim 6 further comprising recording the alterations to the plurality of coefficeints to form a history of alterations, and wherein the step of altering the correction equation comprises selecting an equation to model changes in a coefficient within the plurality of coefficients using a history of alterations.

9. The method of claim 1, wherein the step of altering the correction equation comprises selecting another correction equation.

10. The method of claim 1, wherein the correction equation is an exponential equation.

11. The method of claim 1, wherein the correction equation is a parabolic equation.

12. A method in a data processing system for adjusting a time from a clock circuit within the data processing system, the method comprising:

comparing a time from the clock circuit to a reference time from a reference clock after a period of time has passed, wherein the reference clock is external to the data processing system;

adjusting the time from the clock circuit to a correct time using the reference time from the reference clock, wherein an amount of correction occurs;

recording the amount of correction, wherein a recorded amount of correction is present; and selecting a correction equation using the recorded amount of correction, wherein the time may be adjusted using the correction equation.

13. The method of claim 12, wherein the step of adjusting the time comprises adding an adjustment value to the time from the clock circuit.

14. The method of claim 12, wherein the reference clock is on the internet and wherein the step of comparing a time from the clock circuit to the reference time from the reference clock after a period of time has passed includes connecting the data processing system to the reference time from the reference clock.

15. A data processing system for adjusting a time from a clock circuit within the data processing system comprising:

selection means for selecting a correction equation to adjust the time from the clock circuit, wherein the equation models parameters of the clock circuit that affect the time from the clock circuit;

computation means for computing a correct time from the time using the equation;

adjustment means for adjusting the correct time computed using the equation using a reference time from a source, wherein an amount of correction occurs; and alteration means for altering the correction equation using the amount of correction, wherein the clock time may be adjusted using the amount of correction.

16. The data processing system of claim 15 further comprising:

recording means for recording the amount of correction to form a history of corrections, wherein a recorded amount of correction is present in response to the adjustment means adjusting the clock signal; and adjustment means for periodically adjusting the equation using the history of corrections.

17. The data processing system of claim 16 further comprising:

recordation means for recording the amount of correction each time the correct time is adjusted to form a history of corrections, wherein the adjustment means is activated after the history of correction reaches a selected size.

18. The data processing system of claim 15, wherein the reference time is obtained in response to a communications link being established with the source.

19. The data processing system of claim 18 further comprising:

establishment means for establishing a communications link with the source prior to adjusting the correct time, wherein the communications link to the source is a communications link to the internet.

20. The data processing system of claim 15, wherein the correction equation includes a plurality of coefficients associated with the parameters of the clock circuit that affect the time from the clock circuit.

21. The data processing system of claim 20, wherein the alteration means comprises means for altering at least one coefficient from the plurality of coefficients.

22. The data processing system of claim 15, wherein the alteration means comprises means for selecting another correction equation.

23. The data processing system of claim 15, wherein the correction equation is an exponential equation.

24. The data processing system of claim 15, wherein the correction equation is a parabolic equation.

25. A data processing system comprising:

a bus;

a processor connected to the bus;

a memory connected to the bus;

a clock circuit connected to the bus, wherein the clock circuit generates a clock time; and a communications adapter connected to the bus, wherein the communications adapter provides a communications link to a source, wherein the processor executes first instructions for detecting a communications link to the source, second instructions for receiving a reference clock time from the source, third instructions for comparing the reference clock time to the clock time, fourth instructions for adjusting the clock time from the clock circuit in response to a comparison of the reference clock time to the clock time, fifth instructions for recording an amount of adjustment to the clock time, sixth instructions for creating an adjustment mechanism for adjusting the clock time using the recorded amount of adjustment, wherein the clock time may be adjusted using the adjustment mechanism.

26. The data processing system of claim 25, wherein the adjustment mechanism includes a correction equation having a plurality of coefficients in which the plurality of coefficients model parameters of the clock circuit that effect the clock time generated by the clock circuit, wherein the correction equation is used to adjust the clock time to generate a correct time.

27. A distributed data processing system comprising:

an internet, a source connected to the internet, wherein the source generates a reference clock signal;

a data processing system connected to the internet, wherein the data processing system includes:

a bus;

a processor connected to the bus;

a memory connected to the bus;

a clock circuit connected to the bus, wherein the clock circuit generates a clock time; and a communications adapter connected to the bus, wherein the communications adapter provides a communications link to a source, wherein the processor executes first instructions for detecting a communications link to the source, second instructions for receiving a reference clock time from the source, third instructions for comparing the reference clock time to the clock time, fourth instructions for adjusting the clock time from the clock circuit in response to a comparison of the reference clock time to the clock time, fifth instructions for recording an amount of adjustment, sixth instructions for creating an adjustment mechanism for adjusting the clock time using the recorded amount of adjustment, wherein the clock time may be adjusted using the adjustment mechanism.

28. A computer program product for use with a data processing system for automatically adjusting a time from a clock circuit within the data processing system, the computer program product comprising:

a computer usable medium;

first instructions for adjusting the time from the clock circuit to correspond to a reference time from a source in response to a communications link being established with the source, wherein an amount of correction occurs;

second instructions for recording the amount of correction, wherein a recorded amount of correction is present in response to the step of adjustment of the time; and third instructions for selecting a correction equation using the recorded amount of correction, wherein the equation is used to adjust the time generated by the clock circuit to continue to correspond to the reference time, wherein the instructions are embodied within the computer usable medium.

* * * * *